US006275986B1

(12) United States Patent
Ewart

(10) Patent No.: US 6,275,986 B1
(45) Date of Patent: Aug. 14, 2001

(54) COMPILE-TIME DATA DEPENDENCY VERIFICATION

(75) Inventor: Graham W. Ewart, Don Mills (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/315,426

(22) Filed: May 20, 1999

(30) Foreign Application Priority Data

Jun. 12, 1998 (CA) .................................................. 2240584

(51) Int. Cl.$^7$ ........................................................ G06F 9/45
(52) U.S. Cl. ............................ 717/5; 717/8; 717/4; 714/38
(58) Field of Search ............................... 717/5, 9, 8, 4; 712/216, 227; 714/38

(56) References Cited

U.S. PATENT DOCUMENTS

| | | | |
|---|---|---|---|
| 5,488,722 | * | 1/1996 | Potok ........................................ 707/2 |
| 5,696,973 | * | 12/1997 | Agrawal et al. .......................... 717/9 |
| 5,721,925 | * | 2/1998 | Cheng et al. ........................... 709/303 |
| 5,790,778 | * | 8/1998 | Bush et al. ............................... 714/38 |
| 5,915,116 | * | 6/1999 | Hochman et al. ........................ 717/5 |
| 5,968,113 | * | 10/1999 | Haley et al. .............................. 709/5 |
| 5,987,252 | * | 11/1999 | Leino et al. .............................. 717/4 |

OTHER PUBLICATIONS

Amiel et al., "Type–Safe Relaxing of Schema Consistency Rules for Flexible Modelling in OODBMS," VLDB Journal, vol. 5, No. 2, Apr. 1996, pp. 133–150.*

* cited by examiner

Primary Examiner—Than Q. Dam
(74) Attorney, Agent, or Firm—Scully, Scott, Murphy & Presser; Casey P. August

(57) ABSTRACT

A compiler extension for the compile-time verification of programmer-defined data dependencies. The compiler extension provides for a check statement which takes as an argument a data-verification expression. The data-verification expression has a predetermined value when the programmer-defined data dependency is conformed to in the program. A compile-time error is generated if the data-verification expression does not have the predetermined value on the compilation of the check statement. The successful compilation of the check statement does not result in run-time code or run-time data allocation occurring.

15 Claims, 4 Drawing Sheets

```
LINE STMT
     *...+....1....+....2....+....3....+....4....+....5....+....6....+....7....+....8....+....9....
  1  |#include <stddef.h>
  2  |
  3  |#define Verify(i) typedef int Compile_Time_Assertion_is_Not_True_&brk.!!(i)&rbrk.
  4  |
  5  |
  6  |struct x {
  7  |   int I;
  8  |   int j;
  9  |   int k;
 10  |   int l;
 11  |};
 12  |
 13  |struct y {
 14  |   long double d;
 15  |};
 16  |
 17  |struct z {
 18  |   float f;
 19  |};
 20  |
 21  |void good() {
 22  |
```

FIG. 3A

```
23      // check that x & y are the same size (true)
24      Verify(sizeof(x) = sizeof(y));
25      // check that x.i and x.j are adjacent (true)
26      Verify((offsetof(x,i)+sizeof(((x*)NULL)->i))=offsetof(x,j));
27    };
28
29    void bad() {
30      // check that x & z are the same size (false)
31      Verify(sizeof(x) = sizeof(z));
vfytest.cpp(31:1) : error EDC3038: The array bound must be a positive integral constant expression.
32      // check that x.i and x.k are adjacent (false)
33      Verify(offsetof(x, i)+sizeof(((x*)NULL)->i))=offsetof(x,k));
vfytest.cpp(33:1) : error EDC3038: The array bound must be a positive integral constant expression.
34    };
```

FIG. 3B

COMPILE-TIME DATA DEPENDENCY VERIFICATION

BACKGROUND OF THE INVENTION

1. Technical Field

The present invention is directed to an improvement in compilers and related software development tools and in particular to the verification of data dependencies in computer programs at compile-time.

2. Prior Art

It is common to utilize data dependencies in computer programs. Data dependencies are used in computer programming because they can provide the advantages of memory efficiencies and run-time execution efficiencies.

Where data dependencies are created, program code can be written which will take advantage of characteristics or rules relating to the data structures which are not expressly defined in the programming language, or the data type definition, themselves. Examples of such data dependencies include requirements that two different data structures have identical lengths or that two data elements be adjacent to one another in memory. The programmer can take advantage of these known relationships between data structures to create programs which execute more quickly or with the need for less memory than would otherwise be the case.

Good programming practice requires that such assumptions or rules relating to how the data may be manipulated (the data dependencies) are indicated in the documentation accompanying the computer code. However, the error-free use of data which is subject to the data dependencies relies on the understanding of programmers, rather than on any restriction imposed by the compiler. Problems may arise when modifications are made to the computer program at which time the documentation is not referenced or available, or where the documentation is poorly prepared or inadequately laid out.

Furthermore, in writing complex computer systems, it is often preferable to define data or data types at a particular point in a computer program and to make use of the data or data type at different points in the computer systems or programs which may be remote from the data definition point. The data dependencies relied upon at the remote point may not be referenced in documentation at the data definition point. When modifications are later made to the computer program, the data dependencies may not be apparent to the programmer making the modifications, with the result that errors may arise in the program.

Typically, computer programmers use programming language features which can be utilized to verify such data dependencies at run-time. An example of such a computing language function is the assert macro included in libraries supplied with many compilers for the C programming language. Such macros or programming language features will evaluate specified characteristics of data structures at the point in the execution of the program where the statement or macro is found.

The difficulty with such an approach is that additional code is introduced into the computer program (which in some cases may be minimized or eliminated by compiler optimization). To eliminate this additional code, it is necessary to go through the step of removing the verifying macros or statements in the program entirely after the testing phase of the program development.

The further difficulty with this prior art approach is that because the verification occurs at run-time, if data subject to a data dependency is incorrectly used in a particular piece of programming code which is not executed during testing of the program the error may not be uncovered until some time after the program is put into use. Furthermore, the identification of errors during program testing does not occur at a single time; the program must be put through successive tests to uncover each such error. Finally, such error identification using, for example, the assert macro does not occur until run-time.

It is therefore desirable to have an improved compiler, assembler, or related tools, capable of verifying the correct use of data subject to data dependencies, without introducing additional run-time costs or increased run-time code, which will identify data dependency errors at a single time, and which compiler will not rely on run-time testing of the code to uncover such errors.

SUMMARY OF THE INVENTION

According to one aspect of the present invention, there is provided an improved compiler.

According to a further aspect of the present invention, there is provided an improved compiler capable of performing compile-time verification of data dependencies.

According to a further aspect of the present invention, there is provided a compiler extension comprising a data verification component for compiling a data-dependency expression contained in a computer program, the data-dependency expression reflecting a programmer-defined relationship between data in the computer program, the data-dependency expression having a one of a first set of predefined values when the program conforms to the programmer-defined relationship between data, and the data-dependency expression having a one of a second set of predefined values different from the first set of predefined values, when the computer program does not conform to the user-defined relationship between data, wherein upon compiling the data-dependency expression, the data verification component generates no run-time code or run-time data storage allocation, and upon compiling the data-dependency expression, the data verification component generates a compile-time error message when the value of the data-dependency expression is in the second set of predefined values, and the data verification component generates no compile-time error message when the value of the data-dependency expression is in the first set of predefined values.

According to a further aspect of the invention, the compiler extension includes a data verification component which further comprises a component for including in the compile-time error message reference to the data-dependency expression.

According to a further aspect of the present invention, there is provided a compiler extension for a programming language compiler, the compiler extension comprising a data verification construct for accepting as an argument a data-dependency expression in a computer program, the data-dependency expression reflecting a programmer-defined relationship between data in the computer program, the data-dependency expression having a one of a first set of predefined values when the computer program conforms to the programmer-defined relationship between data, and the data-dependency expression having a one of a second set of predefined values different from the first set of predefined values, when the program does not conform to the user-defined relationship between data, wherein upon compilation of the computer program, the programming language compiler generates a compile-time error message for the compilation of the data verification construct when the value of the data-dependency expression is in the second set of predefined values, and no compile-time error message for compilation of the data verification construct when the value of the data-dependency expression is in the first set of predefined values.

According to a further aspect of the present invention, the compiler extension described above is such that the compilation of the data verification construct generates no run-time code.

According to a further aspect of the present invention, the compiler extension described above is such that the compilation of the data verification construct results in no allocation of run-time data storage.

According to one aspect of the present invention, there is provided an improved method for verifying programmer-defined data dependencies at compile-time, comprising the steps of a) defining a check statement in a computer program, the check statement having an argument, b) inserting the check statement in the computer program at points where a data structure having a programmer-defined data dependency is accessed by the computer program, c) passing as an argument to check statement, a data-dependency expression having a one of a first set of predefined values when the data structure conforms to the programmer-defined data-dependency and having a one of a second set of predefined values different from the first set of predefined values when the data structure does not conform to the programmer-defined data-dependency, the check statement having a definition such that the check statement will compile successfully where the value of the data-dependency expression is in the first set of predefined values, and unsuccessfully where the value of the data-dependency expression is in the second set of predefined values.

According to one aspect of the above method of the invention, the successful compilation of the check-statement will result in minimal or no additional run-time overhead.

According to one aspect of the above method of the invention, the successful compilation of the check-statement will result in the generation of no additional run-time code.

According to one aspect of the above method of the invention, the successful compilation of the check-statement will result in no additional run-time data storage allocation.

Advantages of the present invention include a compiler or assembler which is capable of identifying errors in the use of data subject to data dependencies at compile-time. The invention provides the advantage of identifying such errors, without introducing additional run-time data storage costs or increased run-time code. Further advantages include a compiler which provides the opportunity to identify all data-dependency errors at compile-time, not only the errors which might be located in code executed during run-time testing of the program.

BRIEF DESCRIPTION OF THE DRAWINGS

Preferred embodiments of the present invention will now be described, by way of example only, with reference to the accompanying drawings in which:

FIG. 3 is a computer listing with compiler error messages generated by a compiler operating in accordance with the preferred embodiment of the invention.

Figure 1:
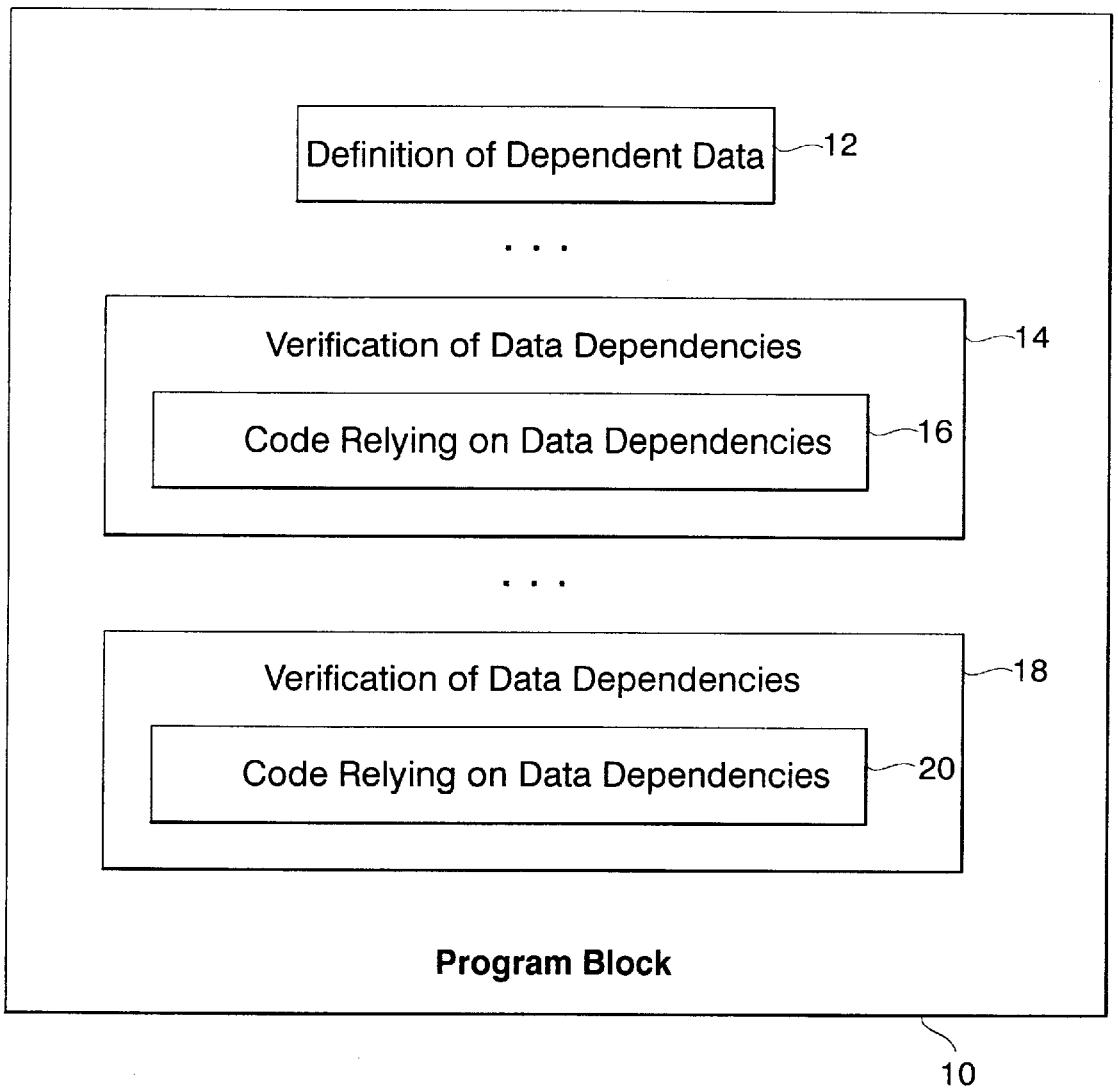
FIG. 1 is a block diagram showing the structure of a computer program written in accordance with the preferred embodiment of the invention.

In the drawings, preferred embodiments of the invention are illustrated by way of example. It is to be expressly understood that the description and drawings are only for the purpose of illustration and as an aid to understanding, are not intended as a definition of the limits of the invention.

DETAILED DESCRIPTION OF THE PREFERRED EMBODIMENTS OF THE INVENTION

Referring to FIG. 1 there is illustrated in a block diagram showing the high level description, only, a structural representation of a computer program to be compiled by a compiler and the compiler extension of the preferred embodiment of the present invention. The example computer program includes a program block 10, a data definition block 12 in which the data structures which are subject to data dependencies are defined. Block 14 is a section of program code, or module, including code to verify the data dependencies and code which, when executed, relies on the defined data dependencies, exemplified by block 16. Blocks 18 and 20 represent further sections of computer code also including verification of data dependencies and, in block 20, code which relies on, the data dependencies.

Figure 2:
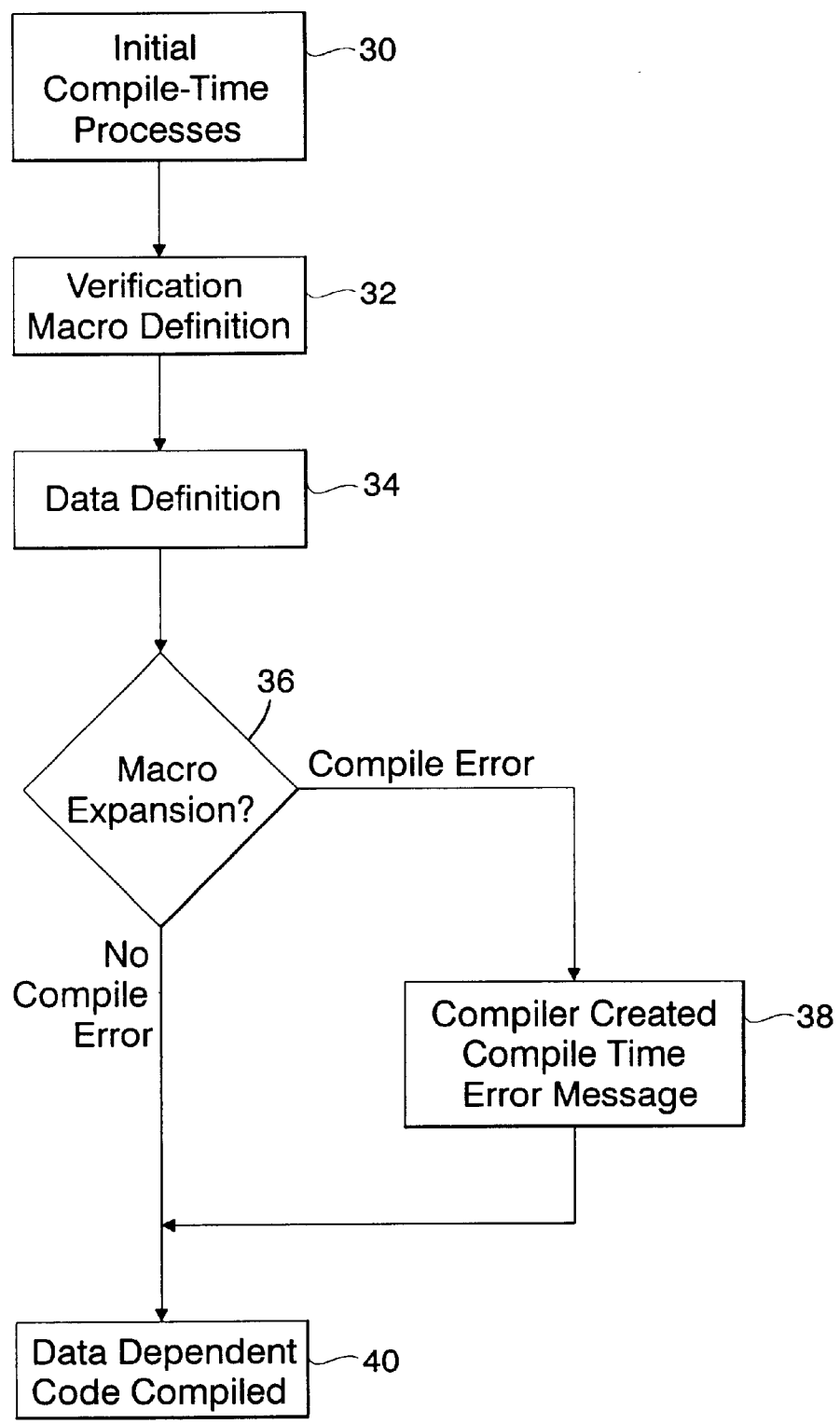
FIG. 2 is a flow diagram showing the compile-time process flow of the preferred embodiment of the invention.

In FIG. 2, a compile-time flow diagram is represented showing in schematic terms, the compile-time flow of the compiler process, in accordance with the preferred embodiment of the invention. Block 30 represents initial compile-time processes. Block 32 represents compilation of a verification macro definition. Block 34 represents the compilation of data definitions, wherein the data is subject to data dependencies. Block 36 represents the macro expansion of the verification macro as found in the program code. Block 38 represents the compiler generated error message resulting from a compiler finding an error in the macro expansion. Block 40 represents the compilation of the code which makes use of the data dependencies.

In FIG. 3, code illustrating an example of the compiler of the invention is set out. The compiler improvement of the present invention may be implemented as a component of a supplied library of macros, or by way of a compiler extension built into the compiler program itself. In this description of the invention, each of those implementations will be referred to as a compiler extension. When implemented as an extension incorporated into the compiler itself, the implementation of the invention will result in the compiler extension itself generating error messages at compile-time. When implemented as a compiler extension which is discrete from the compiler proper, the invention will utilize a data-verification construct which will be compiled in such a way as to result in the compiler generating appropriate error messages. The invention may also be implemented as a standalone macro definition, as is shown in FIG. 3.

Those skilled in the art will appreciate the modifications necessary to implement the present invention using above referenced, or other, standard programming methodologies. Those skilled in the art will also understand that the present invention is applicable to both compilers and assemblers. The present invention is described with relation to compilers but reference to compilers will be taken to include assemblers, where understood to be appropriate by those skilled in the art.

In this detailed description, a preferred embodiment will be described in which the compiler improvement is implemented by way of a macro definition in the high-level computer language C++. In the preferred embodiment of the present invention, implemented by way of a macro definition, a macro is defined which accepts an expression as an argument or parameter. The macro definition is capable of expansion to a statement to be compiled by the compiler but the statement compiled does not give rise to memory allocation at run-time or code which requires execution at run-time. In the example of the preferred embodiment described in FIG. 3, the macro definition comprises a type definition which is an array of a size dependent on the parameter or argument of the macro. Upon compilation of the verification macro definition, the compiler creates a compile-time macro which accepts an argument or a parameter. When the macro is expanded during compilation, the value of the parameter expression (the data-verification expression) will give rise to a statement which can be compiled successfully or which will create an error message in the compiler, depending on the value of the data-verification expression. The macro as used by the programmer may be considered to be a check statement, which accepts a data-verification expression, the successful compilation of the check-statement depending on the value of the data-verification expression. According to the preferred embodiment of the invention, the data definitions which are subject to the data dependencies are compiled in the usual manner, as signified by block 34 in FIG. 2. The program code will include portions which manipulate the data in a manner which relies on the adherence to the data dependencies by the programmer. Examples of these are shown in block 16 and 20 in FIG. 1.

The preferred embodiment of the present invention provides compile-time data dependency verification in the following manner. The macro as defined in block 32 of FIG. 2 is included in the program code in the portion of the code where the data is to be manipulated pursuant to the data dependency rules. This is illustrated in blocks 14 and 18 of FIG. 1. When the macro is expanded as is represented in block 36 of FIG. 2, expressions which define the data dependencies are passed as parameters to the macro. This is seen in FIG. 3 in lines 24, 26, 31 and 33. These lines of the code show the macro "Verify" taking as arguments the data dependency expressions used in the example of FIG. 3: that the size of structure x and structure y are identical and that the data items (x,i) and (x,j) are adjacent. In the first example, the "Verify" macro is being used as check statement, taking the expression "sizeof(x)==sizeof(y)" as the data dependency expression which expresses the programmer-defined relationship between the data.

In the example of FIG. 3, the macro expansion where the expression passed as a parameter has the value "true" will proceed with no compile-time error. As a result, a data type will be defined. A data type definition has no run-time overhead in either memory or execution time and therefore there is no overhead introduced into the resultant execution code. Where, however, the expression passed as an argument is false, the compiler will identify a compile-time error.

Thus, where a data structure is changed in a way which is inconsistent with the defined data dependency, a compile-time error will be generated and the programmer will be alerted that there is a change to the program which breaks the data dependency, and this alert (or error message) will appear at the point in the code where the dependency is introduced. In either event, it is to be noted from the flow chart of FIG. 2, the data dependent code will be compiled.

As can be seen from FIG. 3, where the expressions which are arguments of the "Verify" macro are not true, compile-time error message is generated. It may be noted that FIG. 3 omits the code where the data structure subject to the data dependency is accessed. It will be understood that in a program in which the Verify macro is used, the Verify macro will proceed the code accessing the data structure, as indicated in FIG. 2.

As can be appreciated, other constructs may be used for the macro definition. As long as such constructs do not result in the generation of run-time memory allocation or executable code, the advantage of the invention as illustrated in the preferred embodiment will be achieved.

As also indicated above, this approach to the compile-time detection of data dependency errors can be achieved by incorporating the features illustrated in FIG. 3 by way of a compiler extension which is achieved not through the use of macro definitions or libraries but by way of coding new language features into the compiler itself. The implementation of such an alternative is understood by those skilled in the art of compiler construction. The advantage of such an implementation is that such a compiler may be designed to produce an error message or alert which is tailored by the compiler to provide information to the programmer relating to the data dependency which has not been observed by the computer program code which generates the error message. Such an error message may include information relating to or derived from the data-dependency expression.

While the invention has been particularly shown and described with respect to preferred embodiments thereof, it will be understood by those skilled in the art that the foregoing and other changes in form and details may be made therein without departing form the spirit and scope of the invention.

Having thus described my invention, what I claim as new, and desire to secure by Letters Patent is:

1. A compiler extension residing in a computer system comprising a data verification component for compiling a data-dependency expression contained in a computer program, the data-dependency expression reflecting a programmer-defined relationship between data in the computer program, the data-dependency expression having a one of a first set of predefined values when the program conforms to the programmer-defined relationship between data, and the data-dependency expression having a one of a second set of predefined values different from the first set of predefined values, when the computer program does not conform to the user-defined relationship between data, wherein upon compiling the data-dependency expression, the data verification component generates no run-time code or run-time data storage allocation, and upon compiling the data-dependency expression, the data verification component generates a compile-time error message when the value of the data-dependency expression is in the second set of predefined values, and the data verification component generates no compile-time error message when the value of the data-dependency expression is in the first set of predefined values.

2. The compiler extension of claim 1 in which the data verification component further comprises a component for including in the compile-time error message reference to the data-dependency expression.

3. The compiler extension of claim 1 for a compiler of a computer language which supports programmer-defined data typing and in which the data verification component utilizes the compiler data typing for compiling the data-dependency expression.

4. A compiler extension for a programming language compiler residing in a computer system, the compiler extension comprising a data verification construct for accepting as an argument a data-dependency expression in a computer program, the data-dependency expression reflecting a programmer-defined relationship between data in the computer program, the data-dependency expression having a one of a first set of predefined values when the computer program conforms to the programmer-defined relationship between data, and the data-dependency expression having a one of a second set of predefined values different from the first set of predefined values, when the program does not conform to the user-defined relationship between data, wherein upon compilation of the computer program, the programming language compiler generates a compile-time error message for the compilation of the data verification construct when the value of the data-dependency expression is in the second set of predefined values, and no compile-time error message for compilation of the data verification construct when the value of the data-dependency expression is in the first set of predefined values.

5. The compiler extension of claim 4 in which the compilation of the data verification construct generates no run-time code.

6. The compiler extension of claim 4 in which the compilation of the data verification construct results in no allocation of run-time data storage.

7. The compiler extension of claim 4 in which the programming language compiler supports programmer-defined data typing and in which the data verification construct utilizes the programming language compiler data typing to cause the programming language compiler to generate the error message.

8. The compiler extension of claim 7 in which the compiler extension is contained in a macro library for a C++ programming language compiler.

9. A method for verifying programmer-defined data dependencies at compile-time, comprising the steps of a) defining a check statement in a computer program, the check statement having an argument, b) inserting the check statement in the computer program at points where a data structure having a programmer-defined data dependency is accessed by the computer program, c) passing as an argument to check statement, a data-dependency expression having a one of a first set of predefined values when the data structure conforms to the programmer-defined data-dependency and having a one of a second set of predefined values different from the first set of predefined values when the data structure does not conform to the programmer-defined data-dependency, the check statement having a definition such that the check statement will compile successfully where the value of the data-dependency expression is in the first set of predefined values, and unsuccessfully where the value of the data-dependency expression is in the second set of predefined values.

10. The method of claim 9 in which the successful compilation of the check-statement will result in minimal additional run-time overhead.

11. The method of claim 9 in which the successful compilation of the check-statement will result in the generation of no additional run-time code.

12. The method of claim 9 in which the successful compilation of the check-statement will result in no additional run-time data storage allocation.

13. The method of claim 9 in which the check statement is a compile-time macro.

14. The method of claim 13 in which the compile-time macro is a programmer-defined data type definition.

15. A computer-readable memory for storing the instructions for use in the execution in a computer of the method of claim 9.

* * * * *